United States Patent [19]

Postema et al.

[11] Patent Number: 4,646,093
[45] Date of Patent: Feb. 24, 1987

[54] DIGITAL MONOPULSE FOR TRACKING RADAR

[75] Inventors: Gerrit B. Postema, Wayland; Howard G. Schiffman, Framingham, both of Mass.

[73] Assignee: Raytheon Company, Lexington, Mass.

[21] Appl. No.: 643,340

[22] Filed: Aug. 22, 1984

[51] Int. Cl.$^4$ .......................... G01S 13/44; G01S 7/40
[52] U.S. Cl. ...................................... 342/151; 342/174
[58] Field of Search ............................ 343/16 M, 17.7

[56] References Cited

U.S. PATENT DOCUMENTS

| | | | |
|---|---|---|---|
| 3,113,312 | 12/1963 | Begeman | 343/17.7 |
| 3,229,289 | 1/1966 | Stine | 343/17.7 |
| 3,378,846 | 4/1968 | Lowenschuss | 343/17.7 |
| 3,794,998 | 2/1974 | Pearson, Jr. et al. | 343/16 M |
| 3,921,173 | 11/1975 | Thomson | 343/16 M |
| 3,950,750 | 4/1976 | Churchill et al. | 343/17.7 |
| 3,982,244 | 9/1976 | Ward et al. | 343/16 M |
| 4,021,804 | 5/1977 | Dounce et al. | 343/17.1 R |
| 4,058,810 | 11/1977 | Bryden | 343/17.1 R |
| 4,060,806 | 11/1977 | Davies et al. | 343/17.7 |
| 4,160,975 | 7/1979 | Steudel | 343/16 M |
| 4,348,676 | 9/1982 | Tom | 343/17.7 X |
| 4,524,359 | 6/1985 | Champagne | 343/16 M |

Primary Examiner—T. H. Tubbesing
Assistant Examiner—Mark Hellner
Attorney, Agent, or Firm—Richard M. Sharkansky; Walter F. Dawson; Peter J. Devlin

[57] ABSTRACT

An improved monopulse radar system wherein target return signals received by a plurality of antenna elements are corrected with correction signals derived within the system in response to pilot pulses. The improvement comprises a plurality of receiver channels, each receiver channel being coupled to a single one of the plurality of antenna elements. The improvement also comprises means for generating a first set of quadrature components of video signals developed in the plurality of receiver channels in response to the pilot pulses received by the plurality of antenna elements, and for generating a second set of quadrature components of video signals developed in the plurality of receiver channels in response to return signals from the target received by the plurality of antenna elements. Digital signals representative of the first and second sets of quadrature components of video signals are generated. The digital signals representative of the second set of quadrature components of video signals are digitally corrected with the digital signals representative of the first set of quadrature components of video signals to produce digital signals representative of corrected target return signals. Signals corresponding to the angle of the target relative to the plurality of antenna elements are generated in response to the digital signals representative of corrected target return signals.

9 Claims, 3 Drawing Figures

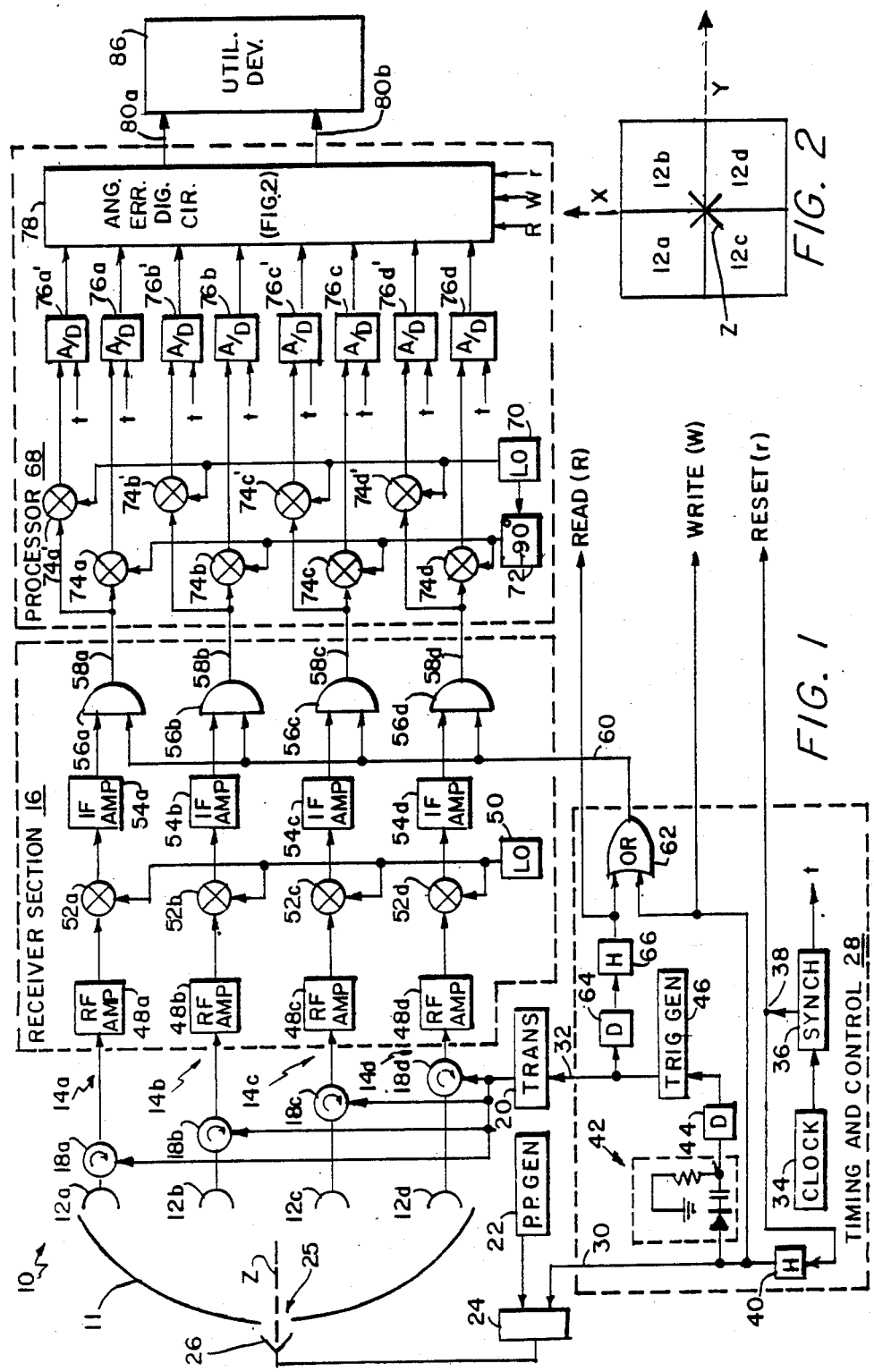

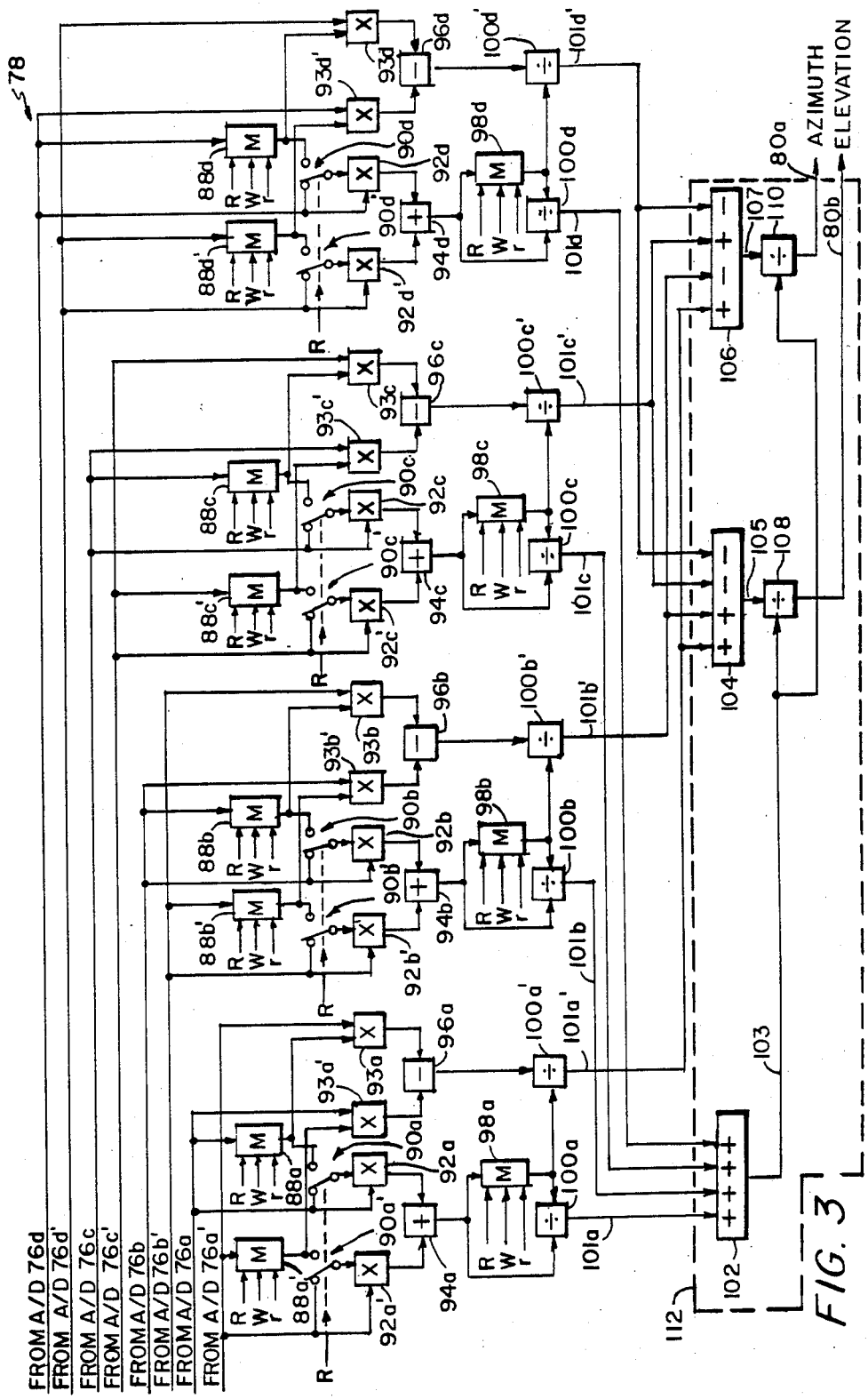

DIGITAL MONOPULSE FOR TRACKING RADAR

The Government has rights in this invention pursuant to Contract No. DAAK10-79-C-0050 awarded by the Department of the Army.

BACKGROUND OF THE INVENTION

This invention relates generally to monopulse radar systems and more particularly to angle error computation apparatus used therein for correcting received radar return signals in accordance with correction signals generated within the receivers in such radar systems.

As is known in the art, in a monopulse radar system the relative phase differences and gain imbalances between each receiver channel may have a significant effect on the angle tracking performance of the radar. The relative phase differences and gain imbalances are of two types: RF errors occurring prior to or in the monopulse comparator used to generate the sum and difference channels in the conventional monopulse receiver; and, gain imbalances and phase errors introduced in the RF and IF sections of the receiver after the sum and difference channels have been formed. Most of the latter errors can be negated by the use of pilot pulses as has been implemented in several systems in the field.

One such system, described in U.S. Pat. No. 3,794,998 issued to Pearson, Jr. et al, uses digital computation apparatus for generating from pilot pulses digital correction signals representative of pairs of quadrature components of video signals developed in the sum and each one of the difference channels. The quadrature components associated with the target return signals are then corrected digitally in accordance with the quadrature components associated with the digital correction signals. While such system has performed satisfactorily in removing the gain imbalances and phase errors introduced in the RF and IF sections of the receiver channels which are common to the target return signals and the pilot pulses, the system does not take into account the gain imbalances and phase errors introduced by the RF monopulse comparator in forming the sum channel and the difference channels. Once such gain imbalances and phase errors are introduced, they are not readily removed. Additionally, in high frequency monopulse radar systems in which signal wavelength is on the order of a few millimeters, the monopulse comparator must be quite small and conform to stringent phase and amplitude matching requirements. Thus, such a monopulse comparator is difficult to fabricate.

SUMMARY OF THE INVENTION

In accordance with the present invention, a radar system is provided comprising a plurality of receiver channels correspondingly coupled to a plurality of antenna elements, each one of the plurality of receiver channels detecting energy received by the antenna element coupled thereto independently of energy received by the other antenna elements. Means are further included for generating a set of error correction signals from energy detected in each one of the plurality of receiver channels in response to pilot pulse energy received by the plurality of antenna elements, and for generating a second set of signals from energy detected in each one of the plurality of receiver channels in response to target return signals received by the plurality of antenna elements. The second set of signals are processed in accordance with the set of error correction signals to produce signals representative of corrected target return signals. Thus, the gain and phase contributions from the plurality of receiver channels are removed from the target return signals and compensation is thus made for differences in the gain and phase characteristics of such channels. With such a system, accurate calculation may be made of the angle error of the target, that is, the target's elevation angle and azimuth angle with respect to the boresight of the antenna.

In a preferred embodiment of the present invention, an improved monopulse radar system is provided wherein target return signals received by a plurality of antenna elements are corrected with correction signals derived within the system in response to pilot pulses. The improvement comprises a plurality of receiver channels, each receiver channel being coupled to a single one of the plurality of antenna elements. The improvement also comprises means for generating a first set of quadrature components of video signals developed in the plurality of receiver channels in response to the pilot pulses received by the plurality of antenna elements, and for generating a second set of quadrature components of video signals developed in the plurality of receiver channels in response to return signals from the target received by the plurality of antenna elements. The improvement further comprises: means for generating digital signals representative of the first set of quadrature components of video signals and for generating digital signals representative of the second set of quadrature components of video signals; and, means for digitally correcting the second set of digital signals with the first set of digital signals in order to produce digital signals representative of corrected target return signals. The signals representative of corrected target return signals are then processed, that is, the monopulse arithmetic is performed thereon, to generate signals corresponding to the angle of the target relative to the plurality of antenna elements.

Thus, the present invention provides a system which automatically corrects any gain imbalances and phase errors occurring throughout the entire radar receiver and also eliminates the requirement for an RF monopulse comparator. The removal of the RF monopulse comparator solves the problem, especially apparent in high frequency monopulse systems, of having to fabricate the monopulse comparator according to stringent phase and amplitude matching requirements.

The invention further provides a monopulse radar system comprising a four-quadrant array of antenna elements and means for producing detected signals representative of energy received by each one of the quadrants of the array of antenna elements. Pilot pulse energy is directed for receipt by the four-quadrant array of antenna elements. Means are further included for generating a set of error correction signals from the detected signals produced in response to the pilot pulse energy received by the array of antenna elements, and for generating a second set of signals from detected signals produced in response to energy received from a target by the array of antenna elements. The second set of signals is corrected with the set of error correction signals to produce corrected target return signals.

The invention further provides a method for correcting target return signals received by a four-quadrant array of antenna elements in a monopulse radar system in accordance with error correction signals derived within the monopulse radar system in response to pilot pulse energy. Detected signals representative of the pilot pulse energy received by each quadrant of the four-quadrant array of antenna elements are first produced. A set of error correction signals is generated from the detected signals produced in response to the received pilot pulse energy. Detected signals representative of the target return signals received by each quadrant of the four-quadrant array of antenna elements are produced. Then, a second set of signals is generated from the detected signals produced in response to the received target return signals. The second set of signals is corrected with the set of error correction signals to produce corrected target return signals.

The invention further provides a system comprising an array of receiving elements for receiving signals from a target, and an arithmetic unit responsive to the target signals received by the array of receiving elements for generating a sum signal representative of the sum of target signals received by at least two elements of the array of receiving elements and a difference signal representative of the difference of target signals received by at least two elements of the array of receiving elements. The improvement in such system comprises an error correction unit, disposed between the array of receiving elements and the arithmetic unit, for correcting errors introduced by the system in the target signals received by the array of receiving elements.

BRIEF DESCRIPTION OF THE DRAWINGS

The foregoing features of the present invention and the advantages thereof may be more fully understood from the following detailed description when read in conjunction with the accompanying drawings wherein:

FIG. 1 is a block diagram of a monopulse radar system according to the invention;

FIG. 2 is a diagram of the monopulse feedhorn assembly configuration of the monopulse radar system of FIG. 1; and FIG. 3 is a functional block diagram of the angle error digital circuitry used in the monopulse radar system of FIG. 1.

DESCRIPTION OF THE PREFERRED EMBODIMENT

Referring first to FIG. 1, a monopulse radar system 10 is shown. Such system first includes an antenna reflector 11 and a four-quadrant array 12a–12d of antenna elements. Each quadrant of array 12a–12d is here shown as a single antenna element and will be referred to as such in this specification; however, it is understood that each quadrant of array 12a–12d may comprise several antenna elements. The antenna elements 12a–12d here are arranged in a conventional symmetrical monopulse feedhorn assembly configuration, as is shown in FIG. 2. Referring once again to FIG. 1, antenna elements 12a–12d are coupled to corresponding receiver channels 14a–14d as shown. It is here noted that antenna elements 12a–12d are each fed directly to corresponding receiver channels 14a–14d, rather than being coupled by an RF monopulse comparator to form a sum channel and a pair of difference channels as in systems of the prior art. Thus, the signals produced in each of receiver channels 14a–14d are representative of the amplitude and phase of the energy received by the one of antenna elements 12a–12d coupled thereto and are independent of the energy received by the other antenna elements. Each receiver channel 14a–14d includes a conventional RF circulator 18a–18d for coupling antenna elements 12a–12d to receiver section 16 and coupling transmitter 20 to antenna elements 12a–12d while isolating receiver section 16 from transmitter 20. Thus, it is seen that antenna elements 12a–12d may be fed by RF signals from transmitter 20 and receiver channels 14a–14d may be fed by received signals from antenna elements 12a–12d from antenna reflector 11. Antenna reflector 11 is a conventional antenna reflector designed to reflect signals transmitted from antenna elements 12a–12d and direct such signals toward a target and to receive signals reflected by a target and in turn reflect such signals to antenna elements 12a–12d. Disposed behind an opening 25 in the center of antenna reflector 11 is center horn 26, which directs pilot pulse energy generated by pilot pulse generator 22 toward the center of the array of antenna elements 12a–12d along the Z axis, also known as the boresight axis of the antenna. As shown in FIG. 2, the array of antenna elements 12a–12d is disposed along the X-Y axis, substantially perpendicular to the boresight axis. Referring again to FIG. 1, pilot pulse generator 22 is a conventional microwave oscillator having a frequency substantially equal to that of transmitter 20. Conventional timing and control section 28 supplies gating signals on line 30 to RF switch 24 to enable RF signals (i.e., pilot pulses) from pilot pulse generator 22 to pass through RF switch 24 to center horn 26 behind antenna reflector 11. Each pilot pulse has a time duration fashioned to permit digital calculation of its orthogonal components to be made in a manner to be discussed. A short time after each pilot pulse is generated, a transmit initiate signal is applied to line 32 by timing and control section 28. Such transmit initiate signal enables transmitter 20 to transmit a pulse of RF energy via circulators 18a–18d and antenna elements 12a–12d. The transmitted signal pulse is reflected by antenna reflector 11 to illuminate a target.

The gating signal on line 30 and the transmit initiate signal on line 32 are produced by conventional timing and control section 28 in the following manner. Clock 34 sends a series of pulses in a conventional manner to synchronizer 36. Synchronizer 36 is of conventional design and sends synchronized pulses, t, to various elements of the radar system which will be described hereinafter, and also produces pulses on line 38. The pulses on line 38 pass through a hold network 40 which may, for example, be a conventional monostable multivibrator. Hold network 40 produces the required gating signal on line 30, the trailing edge of which is sensed by network 42 to actuate delay network 44, which may also be a monostable multivibrator. The trigger signal for trigger generator 46 is derived from the trailing edge of the pulse out of delay network 44. The output signal of trigger generator 46 is the transmit initiate signal on line 32. Thus, it is seen that there is a predetermined time delay between each pilot pulse and each transmitted signal pulse.

Receiver section 16 is a conventional heterodyne receiver and includes RF amplifiers 48a–48d, mixers 52a–52d, IF amplifiers 54a–54d, and range gating circuitry (shown here as AND gates 56a–56d), all of conventional design and arranged to convert RF signals applied to receiver section 16 either in the form of pilot pulses or target return signals into IF signals on lines 58a–58d. To reiterate, the IF signals produced on each of lines 58a–58d represent the amplitude and phase of the energy received by each one of antenna elements 12a–12d, respectively. Such IF signals pass through AND gates 56a-56d each time a gating signal is applied to line 60. Such gating signal is supplied by timing and control section 28 during two exclusive time periods. The first exclusive time period occurs when the gating signal on line 30 is applied to RF switch 24. During such first time period, the signal produced at the output of hold network 40 passes through OR gate 62 and onto line 60. The second exclusive time period commences a selected time after each transmit pulse when the transmit initiate signal on line 32 passes through variable delay network 64, hold network 66 and OR gate 62. The amount of delay introduced by variable delay network 64 is controlled by utilization device 86 by a line not shown. Utilization device 86 includes a conventional range tracking loop which calculates the approximate range of the target from previous target return signals and adjusts the delay of variable delay network 64 to approximately correspond to the round trip transit time of the transmitted pulse. The gating signal at the output of OR gate 62 is applied on line 60 to AND gates 56a-56d during the second exclusive time period. Such signal therefore may be viewed as a conventional range gating signal.

Thus, it is seen that prior to each transmitted pulse, IF signals on lines 58a-58d are produced in response to a pilot pulse. The pilot pulse applied by pilot pulse generator 22 to antenna elements 12a-12d via center horn 26 produces RF signals in receiver channels 14a-14d which are of equal amplitude and phase. Thus, the IF signals produced on lines 58a-58d in response to such pulse would have equal amplitude and equal phase if the RF and IF circuitry in channels 14a-14d had the same gain and phase characteristics. In any practical monopulse system, however, each one of such channels will have gain and phase characteristics which differ from the other channels, and therefore the IF signals on lines 58a-58d will have different amplitude and phase characteristics. At a time after a pulse is transmitted by transmitter 20 (such time corresponding to the range of the target), IF signals corresponding to target return signals from such target appear on lines 58a-58d. As known, the relative amplitude and phase of these target return signals provides a measure of the elevational and azimuthal angular deviation of the target from the boresight axis of the antenna, sometimes collectively referred to as the angle error of the target. For an accurate measure of angle error, account is made in processor section 68 for the gain imbalances and phase differences between channels 14a-14d.

Processor section 68 resolves each one of the IF signals on lines 58a-58d into two orthogonal components by means of a local oscillator 70, quadrature generator 72 and mixers 74a-74d, 74a'-74d'. The frequency of local oscillator 70 is such that the signals produced by mixers 74a-74d, 74a'-74d' have a suitable video frequency so that they may be digitized by A/D converters 76a-76d, 76a'-76d'. Such A/D converters are synchronized on lines labelled "t" by synchronizer 36 of timing and control section 28, and here operate at or above the Nyquist rate of the video signals.

The digitized signals at the output of A/D converters 76a, 76a', 76b, 76b', 76c, 76c', 76d, 76d' are thus quadrature components of signals in response to received RF signals. For example, when the RF signals are the pilot pulses received by the array of antenna elements 12a-12d from pilot pulse generator 22, such digitized signals may be represented respectively by the following equations:

$$T_{1P} = T_o G_1 \cos \theta_1 \quad (1)$$

$$T_{1Q} = T_o G_1 \sin \theta_1 \quad (2)$$

$$T_{2P} = T_o G_2 \cos \theta_2 \quad (3)$$

$$T_{2Q} = T_o G_2 \sin \theta_2 \quad (4)$$

$$T_{3P} = T_o G_3 \cos \theta_3 \quad (5)$$

$$T_{3Q} = T_o G_3 \sin \theta_3 \quad (6)$$

$$T_{4P} = T_o G_4 \cos \theta_4 \quad (7)$$

$$T_{4Q} = T_o G_4 \sin \theta_4 \quad (8)$$

where:
$T_o$ = the amplitude of the pilot pulses;
$G_1$ = the gain of receiver channel 14a;
$G_2$ = the gain of receiver channel 14b;
$G_3$ = the gain of receiver channel 14c;
$G_4$ = the gain of receiver channel 14d;
$\theta_1$ = the phase angle of the signals produced on line 58a in relation to an arbitrary reference;
$\theta_2$ = the phase angle of the signals produced on line 58b in relation to said reference;
$\theta_3$ = the phase angle of the signals produced on line 58c in relation to said reference; and
$\theta_4$ = the phase angle of the signals produced on line 58d in relation to said reference.

As stated previously, each one of receiver channels 14a-14d will have gain and phase characteristics different from those of the other receiver channels 14a-14d. Thus, channel gains $G_1$ through $G_4$ will not all be identical, resulting in amplitude imbalances between the signals in such receiver channels. Likewise, phase angles $\theta_1$ through $\theta_4$ will not all be the same. Therefore, for truly accurate calculations of the angle error of the target, compensation must be made for these gain and phase irregularities. Signals $T_{1P}$-$T_{4P}$ and $T_{1Q}$-$T_{4Q}$ comprise a set of error correction signals which, as will be discussed, are stored for processing with a set of target return signals to remove from the target return signals the gain imbalances and phase differences introduced by receiver channels 14a-14d.

When the received RF signals are target return signals, the digitized signals at the output of A/D converters 76a, 76a', 76b, 76b', 76c, 76c', 76d, 76d' may be represented respectively by the following equations:

$$S_{1P} = T_R G_1 \cos(A + B + \theta_1) \quad (9)$$

$$S_{1Q} = T_R G_1 \sin(A + B + \theta_1) \quad (10)$$

$$S_{2P} = T_R G_2 \cos(A - B + \theta_2) \quad (11)$$

$$S_{2Q} = T_R G_2 \sin(A - B + \theta_2) \quad (12)$$

$$S_{3P} = T_R G_3 \cos(-A + B + \theta_3) \quad (13)$$

$$S_{3Q} = T_R G_3 \sin(-A + B + \theta_3) \quad (14)$$

$$S_{4P} = T_R G_4 \cos(-A - B + \theta_4) \quad (15)$$

$$S_{4Q} = T_R G_4 \sin(-A - B + \theta_4) \quad (16)$$

where:
$T_R$ = the amplitude of such return signals entering receiver channels 14a-14d;

A = the phase angle difference produced by the target return signals between antenna elements 12a and 12c and between antenna elements 12b and 12d, representing the elevation angle of the target;

B = the phase angle difference produced by the target return signals between antenna elements 12a and 12b and between antenna elements 12c and 12d, representing the azimuth angle of the target;

$\theta_1$–$\theta_4$ = the respective phase angles introduced by receiver channels 14a–14d as defined above; and $G_1$–$G_4$ = the respective gains of receiver channels 14a–14d as defined above.

Thus, it is seen that two sets of digital signals are applied to angle error digital circuitry 78, the first set being a set of error correction signals in response to pilot pulses and the second set being in response to target return signals. The details of angle error digital circuitry 78 are illustrated in FIG. 3 and will be discussed hereinafter. Suffice it here to say that the output therefrom includes two digital signals applied on lines 80a, 80b, respectively, to utilization device 86. The signal applied on line 80a represents the azimuth angle of the target and the signal on line 80b is representative of elevation angle of the target. Utilization device 86 is here a conventional device and contains a conventional range tracking loop to supply the variable delay signal to delay network 64 according to the approximate range of the target.

Referring now to FIG. 3, shown is the angle error digital circuitry 78 which is used in the present invention both to correct the gain imbalances and phase errors introduced by the RF and IF circuitry in receiver channels 14a–14d and to compute from the corrected signals the elevation angle error and azimuth angle error of the target, that is, the angle error of the target.

Angle error digital circuitry 78 first comprises two sets of memory units 88a–88d and 88a'–88d' which store therein error correction signals $T_{1P}$–$T_{4P}$ and $T_{1Q}$–$T_{4Q}$, respectively. Also included are two sets of switches 90a–90d and 90a'–90d' controlled in a manner to be described. Further included are four sets of multipliers 92a–92d, 92a'–92d', 93a–93d, and 93a'–93d', all synchronized in a conventional manner by synchronizer 36 (FIG. 1) (via connections not shown) and arranged as shown in FIG. 3. When a pilot pulse is generated, a reset pulse r from synchronizer 36 is sent to memory units 88a–88d, 88a'–88d' to clear the memories. Shortly thereafter memory units 88a–88d and 88a'–88d' are placed in a write condition by signal W from timing and control unit 28. The pilot pulse is then generated and fed into receiver channels 14a–14d (FIG. 1) via center horn 26 and antenna elements 12a–12d as previously discussed. Thus, written into memories 88a–88d are the error correction signals from A/D converters 76a–76d, respectively, and represented by Equations 1, 3, 5 and 7 above. Also, written into memories 88a'–88d' are the error correction signals from A/D converters 76a'–76d', respectively, and represented by equations 2, 4, 6 and 8 above. Switches 90a–90d, 90a'–90d', in the position shown in FIG. 3, direct the error correction signals from A/D converters 76a–76d and 76a'–76d', respectively, into multipliers 92a–92d, 92a'–92d', respectively. Multipliers 92a–92d thus square signals $T_{1P}$–$T_{4P}$, respectively, and multipliers 92a'–92d' square signals $T_{1Q}$–$T_{4Q}$, respectively. The products are added by adders 94a–94d as shown in FIG. 3. Thus a little thought reveals that the signals stored into memories 98a–98d, which are in the write mode as controlled by signal W, are:

$$T_o^2 G_1^2 \tag{17}$$

$$T_o^2 G_2^2 \tag{18}$$

$$T_o^2 G_3^2 \tag{19}$$

$$T_o^2 G_4^2 \tag{20}$$

When a transmitted pulse reflected by a target is received, signal R places the angle error digital circuitry 78 in the read condition. Thus, memory units 88a–88d, 88a'–88d', and 98a–98d are all placed in the read condition. Read signal R also places switches 90a–90d, 90a'–90d' into the alternate position. Thus, the error correction signals stored in memories 88a–88d (Eq. 1, 3, 5 and 7) are multiplied in multipliers 92a–92d with the target return signals $S_{1P}$–$S_{4P}$, (Eq. 9, 11, 13 and 15), respectively, from A/D converters 76a–76d. The respective products are added in adders 94a–94d with the outputs of multipliers 92a'–92d'. Such outputs are the product of the error correction signals stored in memories 88a'–88d' (Eq. 2, 4, 6 and 8) and the target return signals $S_{1Q}$–$S_{4Q}$, (Eq. 10, 12, 14 and 16), respectively, from A/D converters 76a'–76d'. The resultant outputs from adders 94a–94d are divided in dividers 100a–100d by the outputs of memories 98a–98d listed above in Eq. 17–20. The respective quotients appear on lines 101a–101d.

As an example, consider the circuitry in angle error digital circuitry 78 processing signals from A/D converters 76a, 76a'. The output of multiplier 92a may be represented as:

$$T_o T_R G_1^2 \cos \theta_1 \cos (A+B+\theta_1)$$

Likewise, the output of multiplier 92a' is seen to be:

$$T_o T_R G_1^2 \sin \theta_1 \sin (A+B+\theta_1)$$

A little thought reveals that the sum of such signals, appearing at the output of adder 94a is:

$$T_o T_R G_1^2 \cos (A+B)$$

Thus, the outputs of corresponding adders 94b–94d are seen to be:

$$T_o T_R G_2^2 \cos (A-B)$$

$$T_o T_R G_3^2 \cos (-A+B)$$

$$T_o T_R G_4^2 \cos (-A-B)$$

The above denoted outputs of adders 94a–94d, when divided in dividers 100a–100d by the outputs of memory units 98a–98d (Eq. 17–20), yield the following, corrected target return signals on lines 101a–101d, respectively:

$$C_a = (T_R/T_o)\cos(A+B)$$

$$C_b = (T_R/T_o)\cos(A-B)$$

$$C_c = (T_R/T_o)\cos(-A+B)$$

$$C_d = (T_R/T_o)\cos(-A-B)$$

It is seen that the gain ($G_1$–$G_4$) and phase ($\theta_1$–$\theta_4$) contributions from receiver channels 14a–14d are removed from target return signals $C_a$–$C_d$. Thus compensation is made for the differences in the gain and phase characteristics of such receiver channels, and accurate calculation of the target's angle error may be made using target return signals $C_a$–$C_d$.

Also, during the receive period, the stored error correction signals from memories 88a'–88d' are fed to multipliers 93a'–93d' along with target return signals $S_{1P}$–$S_{4P}$ from A/D converters 76a–76d, respectively. Additionally, the error correction signals stored in memories 88a–88d are coupled to multipliers 93a–93d along with target return signals $S_{1Q}$–$S_{4Q}$ from A/D converters 76a'–76d', respectively. The outputs from multipliers 93a'–93d' are subtracted from the corresponding outputs of multipliers 93a–93d in subtractors 96a–96d, as shown. The results are fed to dividers 100a'–100d', respectively.

Again as an example, calculated below are the respective results from the digital error circuitry processing signals from A/D converters 76a and 76a': The output of multiplier 93a may be represented as:

$$T_o T_R G_1^2 \cos \theta_1 \sin(A+B+\theta_1)$$

Likewise, the output of multiplier 93a' is seen to be:

$$T_o T_R G_1^2 \sin \theta_1 \cos(A+B+\theta_1)$$

A little thought reveals that the output of subtractor 96a, subtracting the output of multiplier 93a' from that of 93a, is:

$$T_o T_R G_1^2 \sin(A+B)$$

Thus, the outputs of corresponding subtractors 96b–96d are easily seen to be:

$$T_o T_R G_2^2 \sin(A-B)$$

$$T_o T_R G_3^2 \sin(-A+B)$$

$$T_o T_R G_4^2 \sin(-A-B)$$

As shown in FIG. 3, the outputs of subtractors 96a–96d are divided in dividers 100a'–100d' by the outputs of memory units 98a–98d (Eq. 17-20). The outputs of dividers 100a'–100d', appearing on lines 101a'–101d', are corrected target return signals and may be represented respectively as follows:

$$C_a' = (T_R/T_o)\sin(A+B)$$

$$C_b' = (T_R/T_o)\sin(A-B)$$

$$C_c' = (T_R/T_o)\sin(-A+B)$$

$$C_d' = (T_R/T_o)\sin(-A-B)$$

Again it is seen that the gain ($G_1$–$G_4$) and phase ($\theta_1$–$\theta_4$) contributions from receiver channels 14a–14d have been removed from target return signals $C_a'$–$C_d'$. Thus, accurate calculation of the angle error of the target may be made independently of the gain imbalances and phase differences between receiver channels 14a–14d.

With the gain and phase irregularities between receiver channels 14a–14d removed therefrom, corrected target return signals $C_a$–$C_d$, $C_a'$–$C_d'$ are fed to arithmetic unit 112, and the monopulse arithmetic performed to calculate the angle error of the target (that is, the elevation angle and the azimuth angle of the target with respect to the antenna boresight). Target angles $A+B$, $A-B$, $-A+B$, and $-A-B$, each contain elevation angle information, A, and azimuth angle information, B.

The angular error of the target is derived from corrected target return signals $C_a$–$C_d$, $C_a'$–$C_d'$ by dividing the sum of the in-phase target return signals $C_a$–$C_d$ into the proper arithmetical combination of the quadrature target return signals $C_a'$–$C_d'$, as shown functionally in FIG. 3 with adder 102, adder/subtractors 104, 106 and dividers 108, 110.

Thus, the target return signals on lines 101a–101d are fed to adder 102 in arithmetic unit 112, which provides on line 103 an output signal representative of the sum of such in-phase target return signals. A little thought reveals that the output of adder 102 is:

$$O_{102} = 4(T_R/T_o) \cos A \cos B$$

The target return signals on lines 101a'–101d' are fed in the combinations shown in FIG. 3 to adder/subtractor units 104, 106 in arithmetic unit 112. The output of adder/subtractor 104 appears on line 105 and is seen to be:

$$O_{104} = 4(T_R/T_o) \sin A \cos B$$

The output of adder/subtractor 106 may be represented by:

$$O_{106} = 4(T_R/T_o) \cos A \sin B$$

The output of divider 108 on line 80b represents the elevation angle error $e_{EL}$ of the target and can be denoted as:

$$e_{EL} = O_{104}/O_{102} = \sin A/\cos A$$

$$e_{EL} = \tan A$$

The output of divider 110 on line 80a is indicative of the azimuth angle error $e_{AZ}$ of the target and is:

$$e_{AZ} = O_{106}/O_{102} = \sin B/\cos B$$

$$e_{AZ} = \tan B$$

While a preferred embodiment of the present invention has been described, various modifications and alterations may become apparent to those of ordinary skill in the art. For example, the present invention is not limited to radar systems, but may be used as well in sonar systems. Additionally, the present invention is not limited to monopulse radar systems in which antenna reflectors are used, but may be applied equally as well to phased array antenna systems. In such case the pilot pulses would be transmitted from an auxiliary horn disposed along the boresight axis of the antenna. Also, the pilot pulses may be derived from the transmitter 20 itself, requiring slight changes in conventional timing and control unit 28. Finally, the pilot pulses need not be generated prior to each transmit pulse, but may be interspersed at regular intervals with the transmit pulses. Thus, it is understood that the scope of the present invention is to be limited only by the scope of the appended claims.

What is claimed is:

1. A radar system comprising:

a plurality of independent receiver channels correspondingly coupled to a plurality of antenna elements, each one of the plurality of independent receiver channels detecting energy received by the antenna element coupled thereto independently of energy received by the other antenna elements;

means for generating a set of error correction signals from energy detected in each one of the plurality of independent receiver channels in response to pilot pulse energy received by the plurality of antenna elements, and for generating a second set of signals from energy detected in each one of the plurality of independent receiver channels in response to target return signals received by the plurality of antenna elements; and means for processing the second set of signals in accordance with the set of error correction signals to produce corrected target return signals; and means for combining the corrected target return signals to generate a sum signal representative of the sum of target return signals received by at least two elements of the plurality of antenna elements and a difference signal representative of the difference of target return signals received by at least two elements of the plurality of antenna elements.

2. The radar system of claim 1 wherein the combining means further comprises means for generating, from the sum signal and the difference signal, signals corresponding to the angle of the target relative to the plurality of antenna elements.

3. In a monopulse radar system wherein target return signals received by a plurality of antenna elements are corrected with correction signals derived within the system in response to pilot pulses, the improvement comprising:

a plurality of receiver channels, each receiver channel being coupled to a single one of the plurality of antenna elements;

means for generating a first set of quadrature components of video signals developed in the plurality of receiver channels in response to the pilot pulses received by the plurality of antenna elements, and for generating a second set of quadrature components of video signals developed in the plurality of receiver channels in response to return signals from the target received by the plurality of antenna elements;

means for generating digital signals representative of the first set of quadrature components of video signals and for generating digital signals representative of the second set of quadrature components of video signals;

means for digitally correcting the digital signals representative of the second set of quadrature components of video signals with the digital signals representative of the first set of quadrature components of video signals to produce digital signals representative of corrected target return signals; and means for combining digital signals representative of corrected target return signals received by at least two elements of the plurality of antenna elements form a sum signal, and for combining digital signals representative of corrected target return signals received by at least two elements of the plurality of antenna elements to form a difference signal.

4. The system of claim 3 wherein the digital correcting means comprises:

means for storing the digital signals representative of the first set of quadrature components of video signals; and means for combining such stored digital signals with the digital signals representative of the second set of quadrature components of video signals.

5. The system of claim 3 wherein the combining means includes means for generating, from the sum signal and the difference signal, signals corresponding to the angle of the target relative to the plurality of antenna elements.

6. A monopulse radar system comprising:

a four-quadrant array of antenna elements;

means for producing detected signals representative of energy received by each one of the quadrants of the array of antenna elements independently of energy received by the other ones of the quadrants of the array of antenna elements;

means for combining two of said detected signals to form a sum signal, and for combining two of said detected signals to form a difference signal;

means for directing pilot pulse energy for receipt by the four-quadrant array of antenna elements; and error corrrection means, disposed between the detected signal producing means and the detected signal combining means, such error correction means comprising:

(i) means for generating a set of error correction signals from the detected signals produced in response to the pilot pulse energy received by the array of antenna elements, and for generating a second set of signals from detected signals produced in response to energy received from a target by the array of antenna elements; and (ii) means for correcting the second set of signals with the set of error correction signals to produce corrected target return signals and for coupling the corrected target return signals to the combining means.

7. A method for correcting target return signals received by a four-quadrant array of antenna elements in a monopulse radar system in accordance with error correction signals derived within the monopulse radar system in response to pilot pulse energy, comprising the steps of:

producing detected signals representative of the pilot pulse energy received by each quadrant of the four-quadrant array of antenna elements independently of the pilot pulse energy received by other quadrants of the four-quadrant array of antenna elements;

generating a set of error correction signals from the detected signals produced in response to the received pilot pulse energy;

producing detected signals representative of the target return signals received by each quadrant of the four-quadrant array of antenna elements independently of the target return signals received by other quadrants of the four-quadrant array of antenna elements;

generating a second set of signals from the detected signals produced in response to the received target return signals;

correcting the second set of signals with the set of error correction signals to produce corrected target return signals; and combining a first pair of said corrected target return signals to produce a sum signal representative of the sum of the first pair of corrected target return signals, and combining a second pair of said corrected target return signals to produce a difference signal representative of the difference of such second pair of corrected target return signals.

8. A system comprising an array of receiving elements for receiving signals from a target, and an arithmetic unit response to the target signals received by the array of receiving elements for combining the received target signals to generate a sum signal representative of the sum of target signals received by at least two elements of the array of receiving elements and a difference signal representative of the difference of target signals received by at least two elements of the array of receiving elements, the improvement comprising:

means for coupling the target signals received by each one of the receiving elements in the array of receiving elements to the arithmetic unit independently of the target signals received by the other receiving elements in the array of receiving elements, such coupling means producing errors in the target signals coupled to the arithmetic unit; and error correction means including the coupling means, disposed between the array of receiving elements and the arithmetic unit, for correcting said errors produced in the target signals by said coupling means.

9. A method of correcting target return signals received by a four-quadrant array of antenna elements in a monopulse radar system in accordance with error correction signals derived within the monopulse radar system in response to pilot pulse energy, comprising the steps of:

producing detected signals representative of the pilot pulse energy received by each quadrant of the four-quadrant array of antenna elements independently of pilot pulse energy received by the other quadrants of the four-quadrant array of antenna elements;

producing detected signals representative of the target return signals received by each quadrant of the four-quadrant array of antenna elements independently to target return signals received by the other quadrants of the four-quadrant array of antenna elements;

correcting the detected signals representative of the target return signals received by each quadrant of the four-quadrant array of antenna elements with the detected signals representative of the pilot pulse energy received by each quadrant of the four-quadrant array of antenna elements to produce corrected target return signals; and subsequently combining the corrected target return signals to generate a sum signal representative of the sum of two of the corrected target return signals and a difference signal representative of the difference of two of the corrected target return signals.

* * * * *